United States Patent
Lyon et al.

(10) Patent No.: US 7,102,519 B2
(45) Date of Patent: Sep. 5, 2006

(54) CONCENTRIC TAG-READER METHOD AND SYSTEM FOR RFID

(75) Inventors: Geoff M. Lyon, Menlo Park, CA (US); Cyril Brignone, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 221 days.

(21) Appl. No.: 10/836,476

(22) Filed: Apr. 30, 2004

(65) Prior Publication Data

US 2005/0242958 A1    Nov. 3, 2005

(51) Int. Cl.
*G08B 13/14* (2006.01)

(52) U.S. Cl. ............... 340/572.1; 235/385; 235/439; 340/572.7; 340/572.8; 343/866; 343/878; 343/895; 705/28

(58) Field of Classification Search ............ 340/572.1, 340/572.7, 572.8, 505, 10.1, 5.92; 235/439, 235/492, 385; 343/866, 878, 895; 705/28
See application file for complete search history.

(56) References Cited

U.S. PATENT DOCUMENTS 5,701,995 A    12/1997    Higuma et al.

| 2002/0134699 | A1* | 9/2002 | Bradfield et al. ........... 206/495 |
| 2003/0174099 | A1* | 9/2003 | Bauer et al. ............. 340/572.1 |
| 2004/0195319 | A1* | 10/2004 | Forster ........................ 235/385 |
| 2005/0060246 | A1* | 3/2005 | Lastinger et al. ............. 705/28 |
| 2005/0131578 | A1* | 6/2005 | Weaver ....................... 700/244 |
| 2005/0242183 | A1* | 11/2005 | Bremer .................... 340/572.7 |

FOREIGN PATENT DOCUMENTS

| DE | 19940561 | 4/2001 |
| FR | 2782703 | 3/2000 |
| FR | 2794550 | 12/2000 |
| JP | 2002051882 A * | 2/2002 |

OTHER PUBLICATIONS

Patent Abstracts of Japan—vol. 1999 No. 5—May 31, 1999—Nippon Telegr & Teleph Corp., Japanese Pub. No. 11-39440.

* cited by examiner

*Primary Examiner*—Thomas Mullen (57) ABSTRACT

A system and apparatus for identification of RFID-tagged items includes one or more interrogator units communicating over a network, the interrogator unit comprising a hanger support upon which RFID-tagged items are stored. The apparatus for identification of RFID tagged items includes a solenoid RFID interrogator antenna aligned with the longitudinal axis of an item hanger and a concentric RFID tag antenna wound around an opening in an item package that is hung from the item hanger.

23 Claims, 7 Drawing Sheets

CONCENTRIC TAG-READER METHOD AND SYSTEM FOR RFID

BACKGROUND

The present invention relates to radio frequency identification (RFID) tags. A tag serves to identify the thing to which it is attached. RFID tags can be attached to items to aid in their identification, speed checkout processing in a retail environment and aid in inventory management. The RFID tag is scanned or "interrogated" using radio frequency electromagnetic waves. Interrogating the RFID tag with radio waves allows the interrogator to be out of direct line-of-sight of the tagged item and located at a potentially greater distance from the item than is permitted with optical scanning.

RFID tags can be either active or passive. Active RFID tags carry their own energy source and passive tags derive their energy from the interrogator's radio signal. When a passive RFID tag is in the vicinity of an interrogator, its antenna receives energy from a radio signal broadcast by the interrogator. This energy is rectified and used to power the RFID tag's integrated circuit. After the passive tag's integrated circuit is powered on, it sends its information to the interrogator.

To reduce costs, inexpensive RFID tags generally do not have a conventional radio transmitter; instead, they communicate with a nearby interrogator using a communication technique known as "backscatter propagation." Backscatter propagation involves modulating the antenna matching impedance of the RFID tag with the information to be sent to the interrogator. Modulating the impedance in this manner causes varying amounts of radio energy to be reflected from the tag's antenna, which are received and demodulated by the interrogator.

Backscatter propagation and other radio interrogation techniques allow an interrogator to identify a group of RFID tags en masse. While propagating radio waves over a wide area is advantageous to some RFID applications, it can be disadvantageous to other applications. Conventional RFID systems work well in typical checkout processing done at the point-of-sale because they detect the total items being purchased or checked out. Unfortunately, these RFID systems are not currently able to identify the actual position of individual items as the interrogators do not offer this level of granularity or functionality.

In a retail environment, groups of small items are often displayed on racks incorporating a number of item hangers. Lack of control over the grouping of items on display can also be disadvantageous. Item packages made for display on item hangers often have the same shape and appearance to ease stocking and arrangement of the item hangers. This can be confusing to customers who may select an item for inspection and inadvertently return it to a wrong location due to the similar appearances of nearby packages. For example, packages of camera film may appear identical at first glance, but closer inspection may reveal that the film speed is different or that one is for color prints and the other is for color slides. Manually searching for misplaced items and maintaining the order of items displayed on racks is time-consuming and expensive for retail operators.

Accordingly, there is a need for a system to identify groups of tagged items in a locality using RFID.

BRIEF DESCRIPTION OF THE DRAWINGS

The present invention is illustrated by way of example and not limitation in the figures of the accompanying drawings in which.

Like reference numbers and designations in the various drawings indicate like elements.

SUMMARY OF THE INVENTION

One aspect of the present invention features a system for identifying RFID-tagged items. The system for identification of RFID-tagged items includes one or more interrogator units capable of communicating over a network with each interrogator unit having a hanger support upon which RFID-tagged items are stored.

Another aspect of the present invention features a solenoid RFID interrogation antenna aligned with the longitudinal axis of an item hanger. Yet a further aspect of the present invention features a concentric RFID tag antenna wound around an opening in a item package that is hung from the item hanger with an integral RFID interrogation antenna.

DETAILED DESCRIPTION

Implementations of the present invention concern an RFID interrogator antenna, an item package using a concentric RFID tag antenna as well as related software drivers to facilitate use of the RFID interrogator antenna and item package designed in accordance with the present invention. In one implementation, the RFID interrogator antenna forms and integrates a solenoid coil into an item hanger.

The concentric RFID tag antenna integrated into the item package can be hung from the interrogation unit described above. The concentric RFID tag antenna is wound around an opening in the item package used to hang the package from the hanger integral to the interrogation unit.

Aspects of the present invention are advantageous in at least one or more of the following ways.

In one implementation of the present invention, the solenoid interrogator coil is integrated into the design of a item hanger used to display items in a commercial environment. Such a item hanger is advantageous in that it facilitates the tracking of inventory by determining the identity of items stored on the hanger. Knowing the identity of items in a given location is important for retail practice so that displays of items can be kept orderly so that customers can easily find the items they wish to purchase.

A further advantage of the present invention is that misplaced items can be quickly identified and returned to their proper locations. In a commercial environment, customers will often remove an item from its display hanger for closer inspection. If the customer decides not to purchase the item, it is frequently returned to the wrong hanger. Left unchecked, this process can create enough disorder in the display such that subsequent customers become frustrated in searching for what they want.

Accurate inventory is another advantage of the present invention. The RFID interrogator antenna forms and integrates a solenoid coil into a item hanger along a longitudinal axis. Creating a RFID interrogation antenna in this manner confines the resulting interrogation field to the local area around the solenoid and helps reduce the possibility of erroneously reading RFID tags on items hung from other hangers. This facilitates dense arrangements of items in retail, wholesale, manufacturing and other venues without a high risk of misdetecting inventory.

Yet another advantage is a close coupling between the interrogation unit and the concentric RFID tag antenna. The proximity of the RFID tag antenna to the solenoid RFID interrogation coil in the interrogation unit results in a close coupling between the interrogator unit and the concentric RFID tag antenna. This close coupling between the tag and the interrogation unit permits the interrogation unit to be operated with less power. Aside from energy savings, lower power also creates less interference and, in turn, is less likely to cause erroneous readings of RFID tags on nearby hangers.

Figure 1:
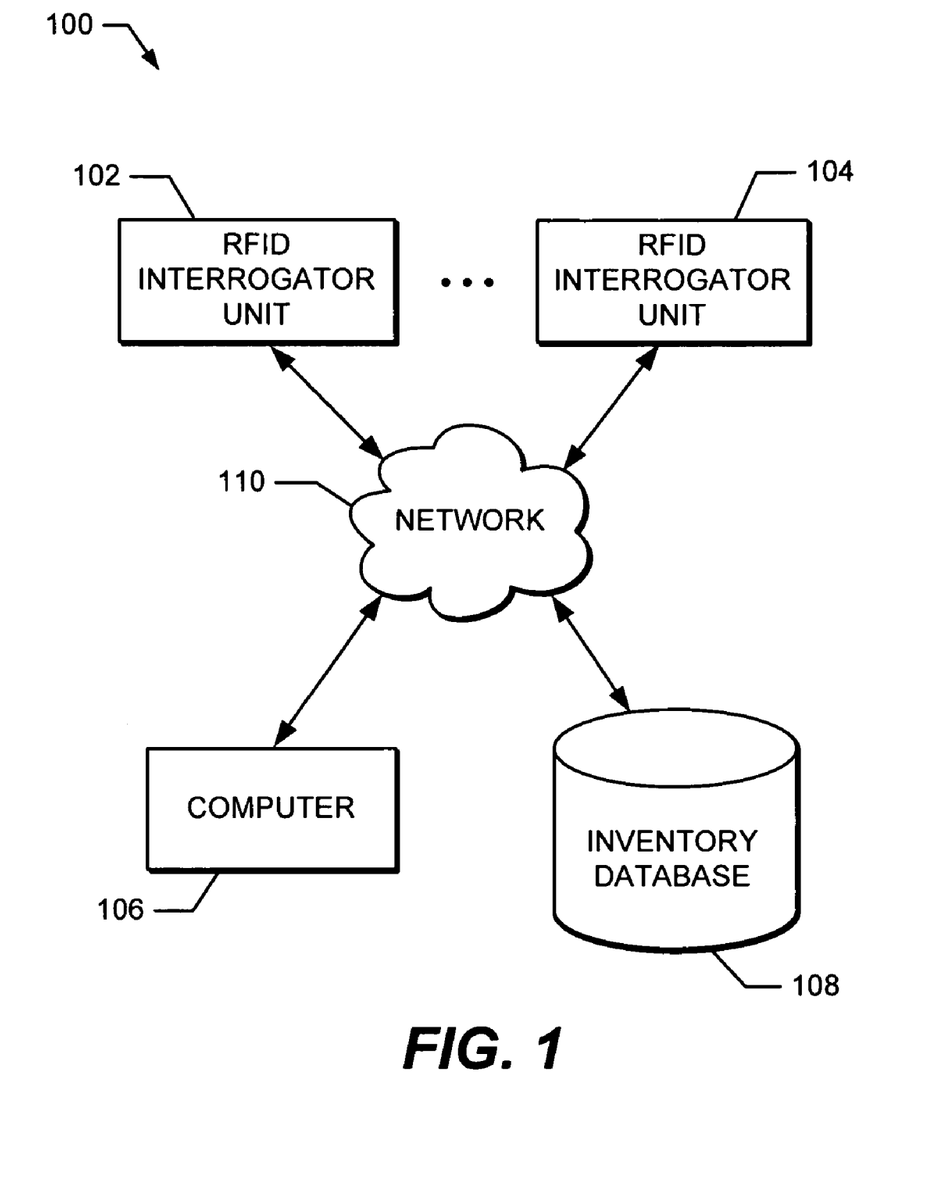
FIG. 1 is a diagram illustrating a RFID interrogator system in accordance with one implementation of the present invention.

Turning first to FIG. 1, a diagram illustrates an RFID interrogator system 100 in accordance with one implementation of the present invention. In this implementation, RFID interrogator system 100 includes one or more interrogator units 102, 104, a computer 106, and an inventory database 108, all communicating over a network 110. Network 110 can either be a local network or the Internet.

Interrogator unit 102 includes a hanger support for storing RFID-tagged items. The hanger support further comprises a solenoid RFID interrogator coil aligned with the hanger support's longitudinal axis that is capable of determining a item identification using RFID. The packages of the RFID-tagged items incorporate concentric RFID tag antennas wound around the hole in the package used to hang the package from the item hanger. The tag antenna encompassing the solenoid interrogator coil ensures optimal electromagnetic coupling between the interrogator coil and tag antenna. The optimal electromagnetic coupling permits the interrogator to be operated at reduced power levels. This reduces energy requirements for the entire interrogator system and also reduces the likelihood of interfering with the reading RFID tags on items placed on other hangers.

In one implementation, inventory database 108 includes the identity of items on the hanger associated with interrogator unit 102 along with a item description. To improve access, entries in the database are indexable by item identification, hanger location or any other field in the database useful by implementations of the present invention. Alternate implementations of the present invention may include greater or fewer fields in inventory database 108 than those described previously as deemed fit for the particular application and use.

There are various methods of keeping entries in inventory database 108 updated with the items and/or inventory associated with RFID interrogator units 102 through 104. In one implementation, one or more RFID interrogator units send a list of item identifications stored in a single location to computer 106 over network 110 in response to a request received over network 110 from computer 106. For example, a single location can include one RFID interrogator unit providing a single item hanger or multiple RFID interrogator units providing a group of item hangers within a physical area. There can also be a logical grouping of RFID interrogator units providing item hangers for items in different geographic areas. Instead of organizing items and corresponding RFID interrogator units by geography, the multiple RFID interrogator units are grouped together depending on the item type or other common database field entries in inventory database 108. Computer 106 indexes inventory database 108 with the identification of interrogator unit 102 and each item identification to obtain a item description and a corresponding item date code or other relevant data field. The item description along with its proper storage location is also sent to computer 106 over network 110. Computer 106 has a database with the ideal stocking pattern and criteria (i.e., associations between items and RFID interrogator units, chronological order of items on the RFID interrogator units, and other stocking details) for the various items and compares this information with the actual information gathered to determine if any items are incorrectly stored on interrogator unit 102.

In yet another implementation, interrogator unit 102 periodically indexes inventory database 108 with the item identifications of the items stored upon it. Inventory database 108 responds by sending the item's description over network 110 to interrogator unit 102. Each interrogator unit determines the ideal stocking pattern and criteria and compares this information with the actual information gathered. This distributed computing approach performs the comparison between the ideal stocking pattern and the actual inventory over multiple interrogator units rather than just computer 106. The various interrogator units calculate if any items are out of order or incorrectly positioned on the interrogator unit hanger. At predetermined time intervals, computer 106 queries interrogator unit 102 and other interrogator units directly to identify the stored items and potentially any anomalous item storage conditions. For example, item storage conditions may include information about a misplaced item, an improper stocking arrangement and other stocking conditions of interest to the particular inventory application or implementation.

In still yet another implementation, interrogator unit 102 indexes inventory database 108 with a item's identification when the item is first placed upon it. Inventory database 108 responds by sending the item description and its proper storage location over network 110 to interrogator unit 102. Interrogator unit 102 calculates if the item is in its proper location. Conversely, when the item is removed from the interrogator unit, the item identification and its location are also sent to computer 106 over network 110. Additionally, if any anomalous item placement occurs, a message describing the condition is sent to computer 106 over network 110. At predetermined time intervals, interrogator unit 102 sends its identification along with identifications and ordering of the items stored upon it to computer 106 over network 110.

Figure 2A:
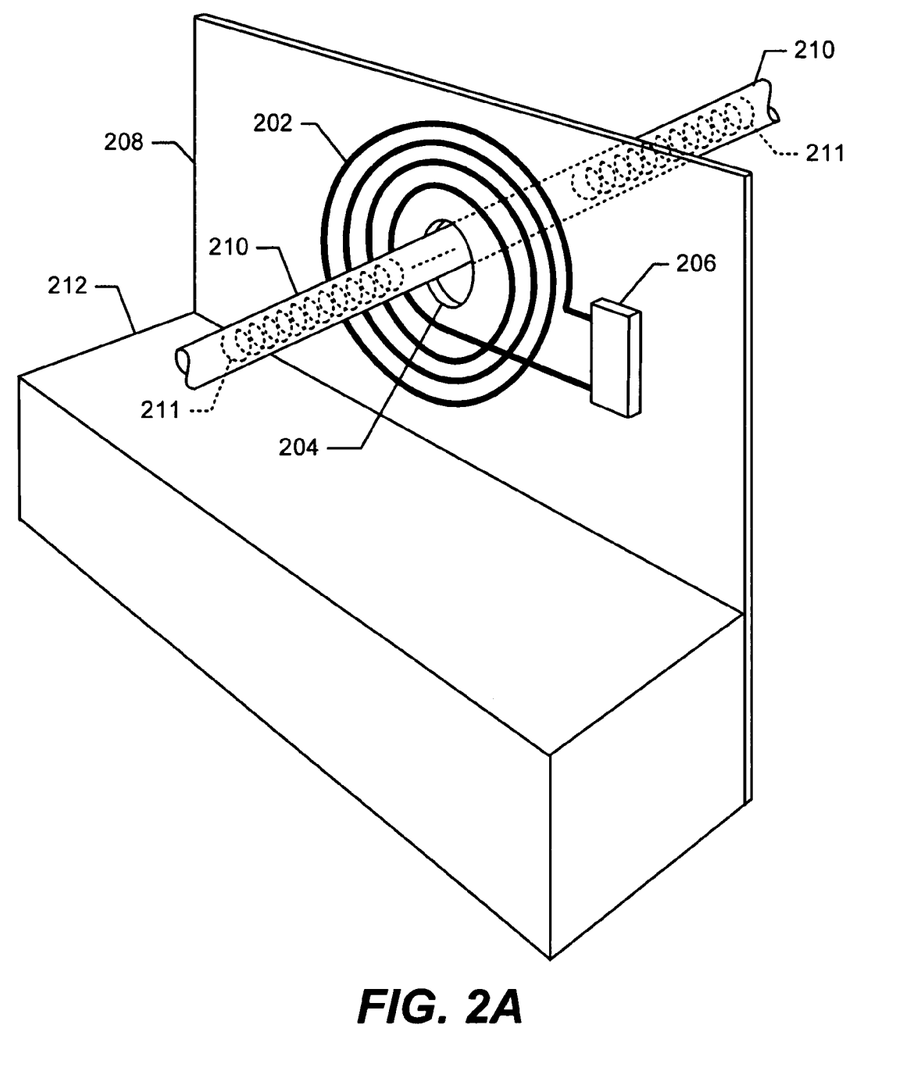
FIG. 2A is a perspective diagram illustrating a concentric RFID tag antenna in accordance with one implementation of the present invention.

Turning next to FIG. 2A, a perspective diagram illustrating a concentric RFID tag antenna 202 in accordance with one implementation of the present invention. A item package 212 includes a package flap 208 with an opening 204 that facilitates the hanging of package 212 from an item hanger 210 incorporating an integral RFID interrogation antenna 211 in the form of a solenoid coil. Concentric RFID tag antenna 202 is wound around opening 204 and connected to an RFID tag 206.

Concentric RFID tag antenna 202 is made from one or more turns of conductive material wound around opening 204. In one implementation of the present invention, the conductive material for concentric RFID tag antenna 202 is metallic and chosen from the group including copper, tin, aluminum, tantalum, silver, gold and platinum. In another implementation of the present invention, the conductive material for concentric RFID tag antenna 202 is conductive ink. Conductive ink permits concentric RFID tag antenna 202 to be printed upon package flap 208 rather than conventional fabrication. In yet another implementation of the present invention, concentric RFID tag antenna 202 is printed or otherwise constructed on a separate medium which is then affixed to package flap 208.

RFID tag 206 receives electromagnetic energy to power its functional operation from concentric RFID tag antenna 202. The electromagnetic energy is transmitted by RFID interrogation antenna 211. In one implementation of the present invention, RFID interrogation antenna 211 is a solenoid aligned with the longitudinal axis of item hanger 210. In another implementation of the present invention, RFID interrogation antenna 211 is a solenoid wound around the longitudinal axis of item hanger 210.

Interrogation commands and data for tag 206 are sent through RFID interrogation antenna 211 and are received by concentric RFID tag antenna 202. An RFID tag using backscatter modulation transmits its data by modulating the impedance of tag antenna 202. The impedance variations are sensed by interrogator antenna 211 and are interpreted as data by the RFID interrogator driving interrogator antenna 211.

Figure 2B:
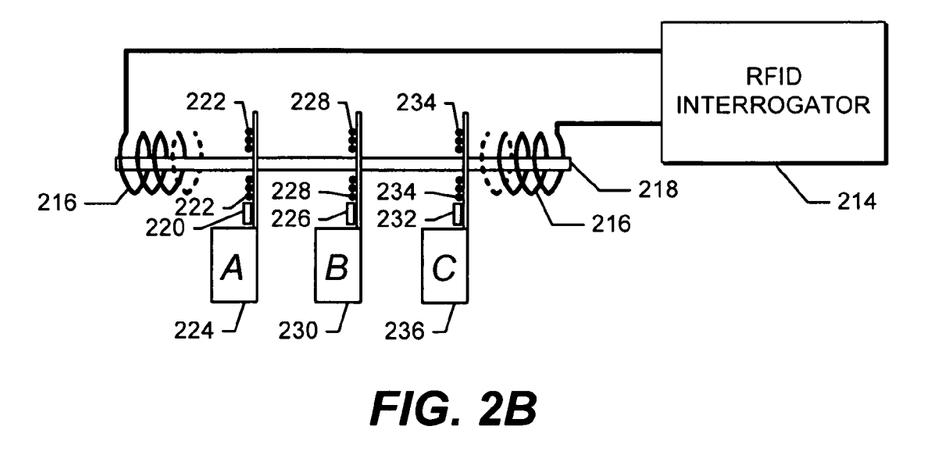
FIG. 2B is a diagram illustrating an RFID interrogator unit and item hanger incorporating a solenoid RFID interrogator coil in accordance with one implementation of the present invention.

Turning now to FIG. 2B, a diagram illustrates an RFID interrogator unit 214 and item hanger 218 incorporating a solenoid RFID interrogator coil 216 in accordance with one implementation of the present invention. Stored upon item hanger support 218 are three items: item A 224 with its associated RFID tag 220 and RFID tag antenna 222, item B 230 with its associated RFID tag 226 and RFID tag antenna 228, and item C 236 with its associated RFID tag 232 and RFID tag antenna 234.

In one implementation of the present invention, solenoid RFID interrogator coil 216 is wound around the longitudinal axis of item hanger support 218. Solenoid RFID interrogator coil 216 creates an RFID interrogation field whereby the aggregate of RFID tags 220, 226, 232 and their associated items can be identified. In another implementation of the present invention, solenoid RFID interrogator coil 216 is not wound around but aligned along the length of the longitudinal axis of item hanger support 218.

RFID tag antennas 222, 228, 234 encircle solenoid RFID interrogator coil 216. This arrangement ensures optimal electromagnetic coupling between solenoid RFID interrogator coil 216 and tag antennas 222, 228, 234. Close electromagnetic coupling reduces the power output requirement of interrogator 214. Reducing the power output of RFID interrogator unit 214 reduces the possibility of erroneously reading a tag not associated with item hanger support 218. Additionally, reducing the power output of RFID interrogator unit 214 reduces its energy consumption.

Figure 2C:
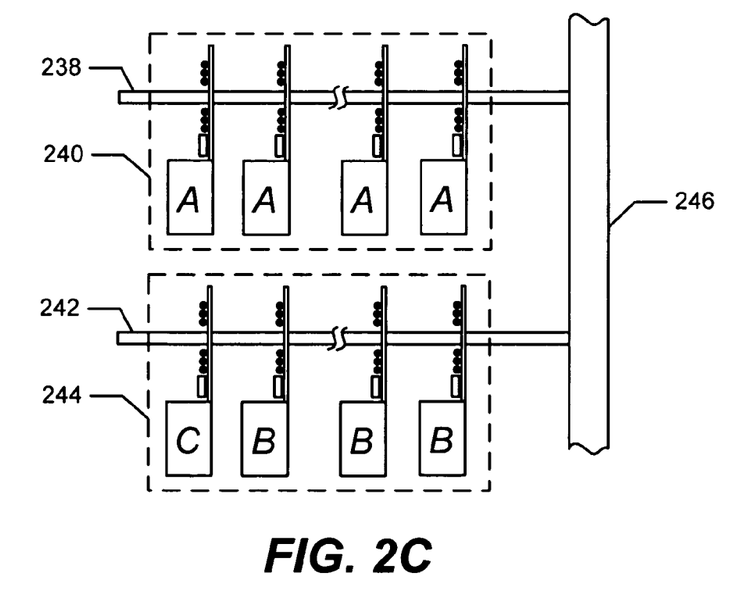
FIG. 2C is a diagram illustrating RFID antennas used as item storage hangers in accordance with one implementation of the present invention.

FIG. 2C is a diagram illustrating RFID interrogator antennas 238, 242 used as item storage hangers in accordance with one implementation of the present invention. Multiple RFID interrogator antennas 238, 242 are attached to a support 246 to provide high-density display and storage of groups of RFID-tagged items 240, 244. The disposition of groups of RFID-tagged items 240, 244 can be readily determined using RFID interrogator antennas 238, 242 where each RFID interrogator antenna can be used to ascertain the identities of items stored on their respective hangers. For example, the group of RFID-tagged items 240 represents a properly stocked hanger where all items A are the same. In contrast, the group of RFID-tagged items 244 represents an improperly stocked hanger where an item C has been incorrectly placed among the items B.

Figure 3:
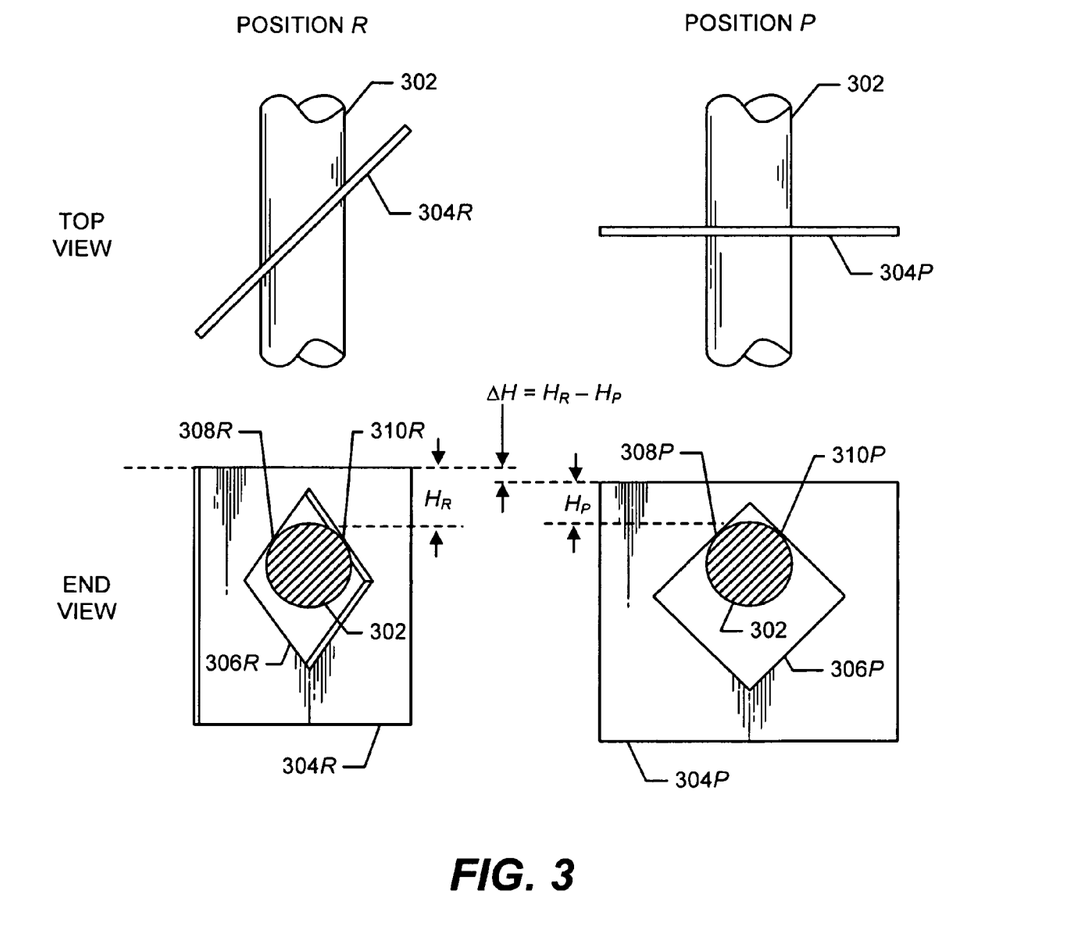
FIG. 3 is a diagram illustrating two conformations of a item hanger and an opening in a package flap in accordance with one implementation of the present invention.

FIG. 3 is a diagram illustrating two arrangements of a item hanger 302 and an opening 306R, 306P in a package flap 304R, 304P in accordance with one implementation of the present invention. In the illustrated example, opening 306R, 306P illustrate the same diamond shape but at different orientations. A thin sheet of material representing a package flap 304R is illustrated in the rotated orientation while the package flap 304P illustrates a perpendicular orientation with respect to item hanger 302. Both the perpendicular and rotated positions are shown from a top view perspective looking down on item hanger 302 and an end view perspective looking along the longitudinal axis of item hanger 302. The edge of opening 306R touches item hanger 302 at two points 308R, 310R while in the rotated position. Similarly, the edge of opening 306P also touches item hanger 302 at two different points 308P, 310P but in the perpendicular position or orientation.

By this design, gravity operates upon package flap 304R in the rotated position forcing package flap 304R to settle on the more stable perpendicular position of package flap 304P. The rotated orientation of package flap 304R around its vertical axis effectively narrows its opening 306R with respect to the longitudinal axis of item hanger 302 as illustrated in the End View of Position R. The effective narrowing of opening 306R due to the rotated orientation causes flap-hanger contact points 308R, 310R to be farther away from the top edge of flap 304R than when it is in the perpendicular orientation. This causes package flap 304R to sit higher above item hanger 302 than when it is in the perpendicular orientation. The distance from the top edge of item hanger 302 to the top edge of rotated package flap 304R is represented as $H_R$.

The perpendicular orientation of package flap 304P with respect to the longitudinal axis of item hanger 302 presents the full width of opening 306P to the cross section of item hanger 302 as illustrated in the End View of Position P. Placing the full width of opening 306P perpendicular to the longitudinal axis of item hanger 302 causes flap-hanger contact points 308P, 310P to be a minimum distance away from the top edge of flap 304P. This causes package flap 304P to sit a minimum distance above item hanger 302. The distance from the top edge of item hanger 302 to the top edge of rotated package flap 304P is represented as $H_P$.

Rotating package flap 304P with two contact points 308P, 310P from a perpendicular orientation with item hanger 302 to a rotated orientation 304R causes it rise above item hanger 302 while maintaining contact points 308R, 310R. The change in height ΔH above of rotated package flap 304R above item hanger 302 is the difference between rotated height $H_R$ and perpendicular height $H_P$, $\Delta H = H_R - H_P$. The increase in height ΔH above item hanger 302 of rotated package flap 304R results in increased potential energy for the rotated orientation. The increased potential energy of the rotated orientation is an unstable state and the effect is to return rotated package flap 304R to its minimum-energy perpendicular orientation 304P.

As previously described, in one implementation of the present invention, an interrogation antenna is integrated into the longitudinal axis of a item hanger and a concentric RFID tag antenna is integrated into the flap of a item package designed to be hung from the item hanger. Maintaining a perpendicular orientation between the RFID interrogation antenna and the tag antenna integral to the package flap is important to maintain the coupling between the interrogator antenna and tag antenna. A higher degree of electromagnetic coupling assures more efficient energy transfer from the interrogator antenna to the tag antenna, fewer data transmission errors, and permits lower operating power of the interrogator signal. The lower energy requirements from the interrogator signal results in lower energy requirements for the interrogator and a lesser possibility of interfering with the reading of nearby tags not associated with the subject interrogator.

Figure 4:
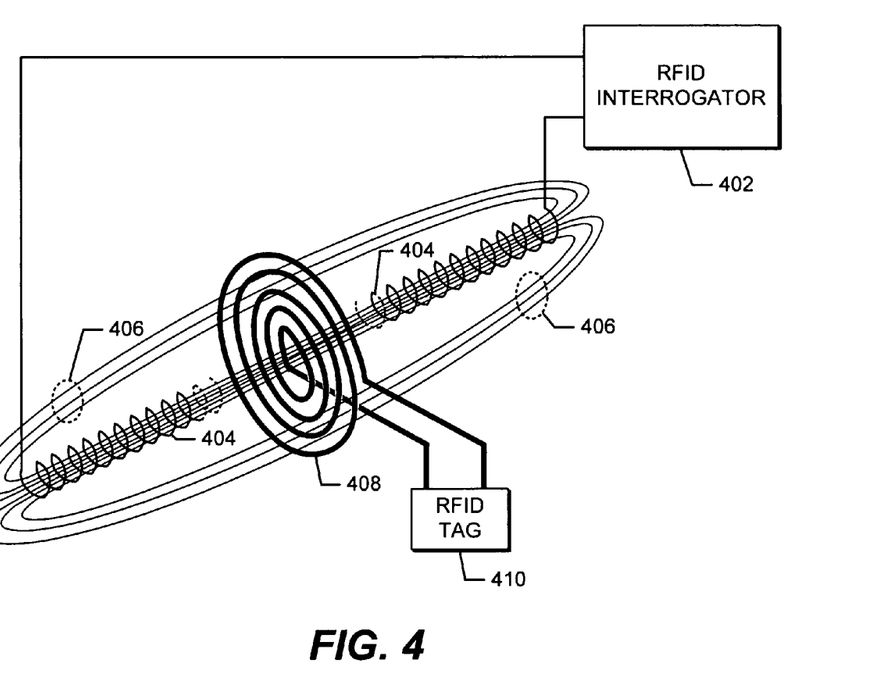
FIG. 4 is a diagram illustrating the interaction of a solenoid's RFID interrogator field with a concentric RFID tag antenna in accordance with one implementation of the present invention.

FIG. 4 is a diagram illustrating a RFID interrogator field 406 from solenoid interrogator coil 404 interacting with a concentric RFID tag antenna 408 in accordance with one implementation of the present invention. RFID interrogator 402 excites solenoid interrogator antenna 404 to produce RFID interrogation field 406. Oscillations of RFID interrogator field 406 induce a signal in concentric RFID tag antenna 408 and powers the remaining portion of RFID tag 410.

Coupling between interrogator coil 404 and concentric RFID tag antenna 408 results from the "lines of force" associated with RFID interrogation field 406. These lines of force cut across the turns of conductive material forming concentric tag antenna 408. RFID interrogation field 406 of the present invention expands away from solenoid interrogator coil 404 and shrinks back towards the solenoid interrogator coil 404 before reversing direction. In one implementation, the oscillation cycle is determined when the expansion and contracting have completed. Expansion and contraction of RFID interrogation field 406 cause the previously described lines of force to move and cut through the turns of conductive material forming tag antenna 408 and generate an oscillating electric current to RFID tag 410.

As previously described, orientating concentric RFID tag antenna 408 with respect to the longitudinal axis of interrogator coil 404 affects the electromagnetic coupling between interrogator coil 404 and tag antenna 408. Arranging the planar dimension of tag antenna 408 perpendicular to the longitudinal axis of interrogation antenna 404 provides an optimal orientation. At this orientation, a larger number of lines of force associated with interrogator field 406 generates a higher amplitude signal from antenna 408 as the lines of force cuts through the windings of concentric RFID tag antenna 408. Conversely, if the planar aspect or dimension of tag antenna 408 rotates away from the perpendicular orientation to interrogator coil 404, fewer lines of force will cut through tag antenna 408, reducing its output signal amplitude.

Figure 5:
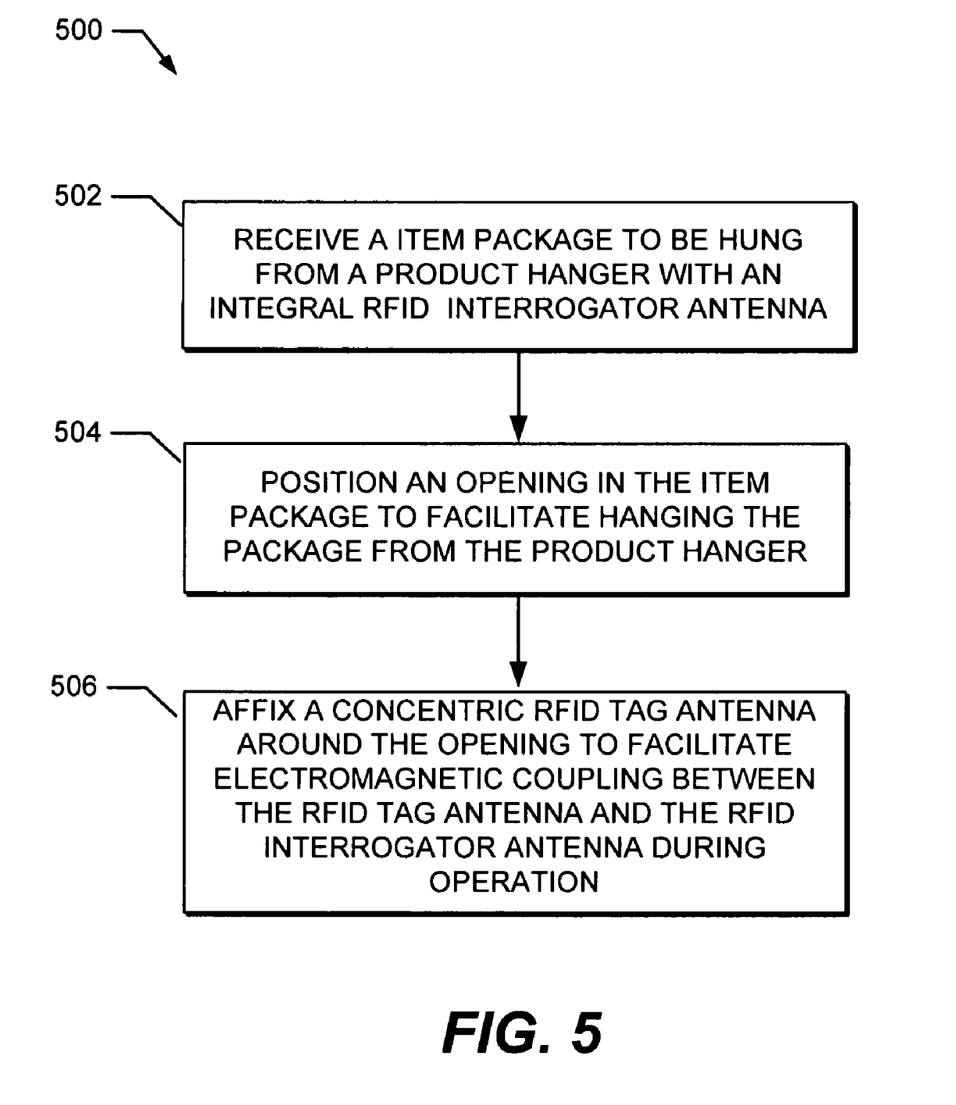
FIG. 5 is a flowchart diagram of the operations pertaining to manufacturing a package with RFID capabilities in accordance with one implementation of the present invention.

FIG. 5 is a flowchart diagram 500 of the operations pertaining to manufacturing a package with RFID capabilities in accordance with one implementation of the present invention. The process of manufacturing the package with RFID capabilities begins with receiving a item package to be hung from a item hanger incorporating an integral RFID interrogation antenna (502). In one implementation of the present invention the item package includes a flat sheet of package material prior to its formation into a container. In another implementation of the present invention the item package includes a cardboard box with a flap extending from the box to receive the opening to facilitate hanging the package from the item hanger. In yet another implementation of the present invention the item package includes a flat sheet of material to which a plastic enclosure is attached to contain an item. An ink cartridge for a printer is one example of an item that can be sold in a package with RFID capabilities and take advantage of the above features.

The manufacturing process positions an opening in the item package to facilitate hanging the package from the item hanger (504). As previously described, the item package may include either a package finished into a container or the underlying form or sheet of package material prior to being formed into the container. The item package, as previously described, will tend to align itself perpendicularly to the item hanger under the force of gravity. For example, the item package aligns itself perpendicular to the item hanger if the relative shapes of the opening and item hanger cross-section are such that the opening that touches the item hanger at two points. Aligning the integral RFID interrogation antenna perpendicular to the item hanger and item package increases coupling and improves signal transmission between the respective antennas.

The manufacturing process affixes the concentric RFID tag antenna around the opening to facilitate electromagnetic coupling between the concentric RFID tag antenna and the RFID interrogator antenna during operation (506). As previously described, the concentric RFID tag antenna is made from one or more turns of conductive material wound around the opening. In one implementation of the present invention, the conductive material selected for antenna is metallic and chosen from the group of metals including copper, tin, aluminum, tantalum, silver, gold and platinum. In another implementation of the present invention, the conductive material for antenna is conductive ink. Conductive ink permits the concentric RFID tag antenna to be printed upon the package material. In yet another implementation of the present invention, the antenna is printed or otherwise constructed on a separate medium that is then affixed to the package.

Figure 6:
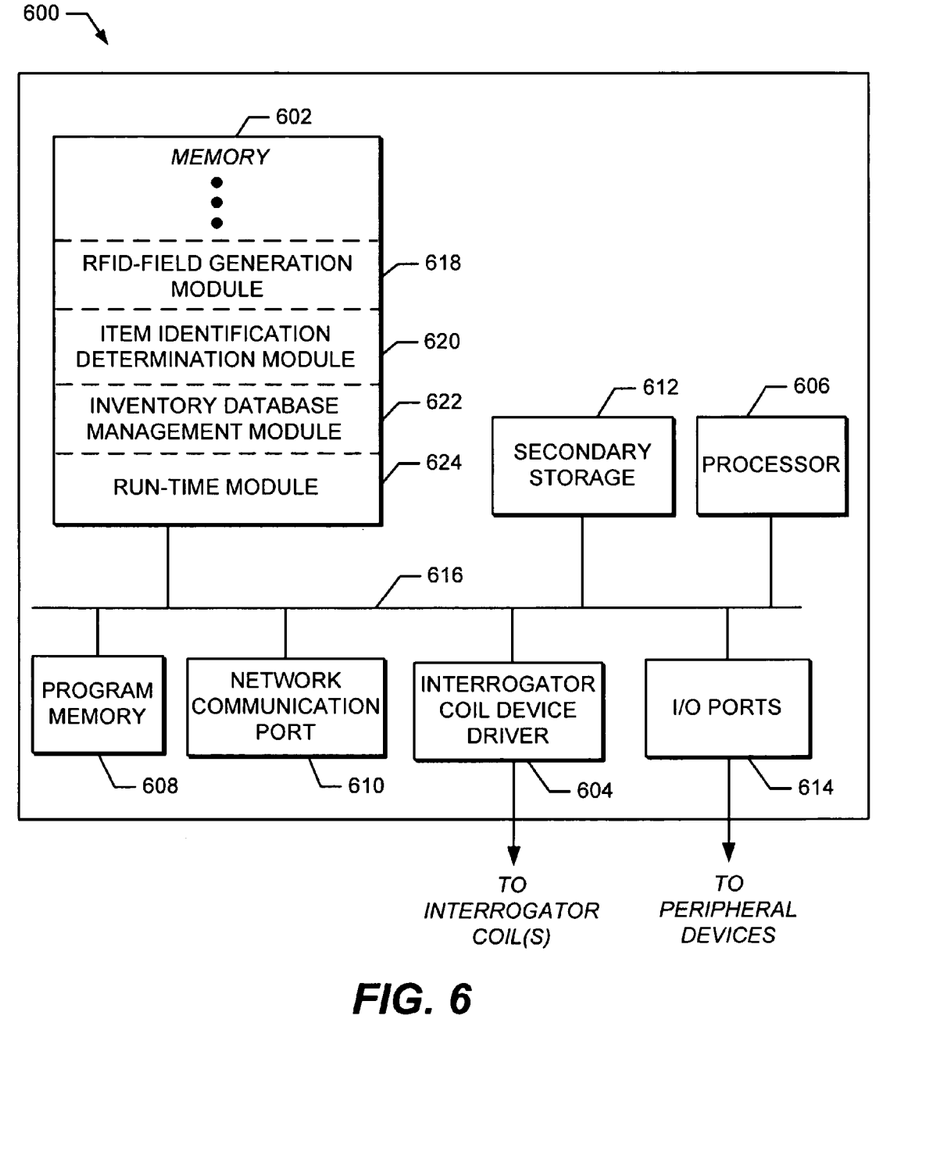
FIG. 6 is a diagram illustration of a system capable of performing one or more operations associated with the RFID tag designed in accordance with the present invention.

FIG. 6 is a diagram of a system 600 used in one implementation for performing the apparatus or methods of the present invention. In one implementation, system 600 is embedded in and part of the hanger apparatus of the present invention as illustrated in FIG. 2B. Alternatively, system 600 can be a computer system separate from the hanger apparatus of the present invention and controls the hanger apparatus over a network at some other remote location.

System 600 includes a memory 602 to hold executing programs (typically random access memory (RAM) or writable read-only memory (ROM) such as a flash ROM), an interrogator coil device driver 604 capable of interfacing and driving one or more interrogator coils, a processor 606, a program memory 608 for holding drivers or other frequently used programs, a network communication port 610 for data communication, a secondary storage 612 with secondary storage controller, and input/output (I/O) ports 614 also with I/O controller operatively coupled together over an interconnect 616. The system 600 can be preprogrammed, in ROM, for example, using field-programmable gate array (FPGA) technology or it can be programmed (and reprogrammed) by loading a program from another source (for example, from a floppy disk, a CD-ROM, or another computer). Also, system 600 can be implemented using customized application specific integrated circuits (ASICs).

In one implementation, memory 602 includes an RFID-field generation module 618, an RFID item identification determination module 620, an inventory database management module 622 and a run-time module 624 that manages system resources used when processing one or more of the above components on system 600.

RFID-field generation module 618 controls the generation of an RFID interrogation field for a specific RFID interrogator antenna and item hanger in accordance with the present invention. For example, these calculations may include generating an RFID field of adequate strength to read all RFID tags associated with the RFID interrogator antenna, but not so strong as to erroneously read tags of items on other RFID interrogator antenna and hangers.

Item identification determination module 620 analyzes the results produced when the RFID interrogator field is generated. The analysis allows item identification determination module 620 to determine the identities of items on a hanger, the aggregate of items in the vicinity of the hanger as well as other information about the items. For example, item identification determination module 620 can flag when the placement of the items is not coincident with the default or desired placement of the items (e.g., all items on a single hanger should be of one type).

Inventory database management module 622 keeps track of the items identified by the above modules and apparatus. This module is responsible for rebuilding and indexing the inventory database to satisfy database performance and integrity as required by the particular application or implementation. For example, inventory database management module 622 may direct rebuilding database indices each time an item is removed or added to RFID interrogator antenna and hanger device of the present invention.

While examples and implementations have been described, they should not serve to limit any aspect of the present invention. Accordingly, implementations of the invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs.

Further, while specific embodiments have been described herein for the purposes of illustration, various modifications may be made without departing from the spirit and scope of the invention. Accordingly, the invention is not limited to the above-described implementations, but instead is defined by the appended claims in light of their full scope of equivalents.

What is claimed is:

1. A system for identifying RFID-tagged items, comprising: one or more interrogator units capable of communicating over a network, the one or more interrogator units each comprising a hanger support further comprising a solenoid RFID interrogator coil aligned with the hanger support's longitudinal axis upon which RFID-tagged items are capable of being stored; and an RFID-tagged item associated with a package, said RFID-tagged item comprising a concentric RFID tag antenna wound around an opening in the package, wherein the package hangs from the hanger support through the opening in the package to ensure optimal electromagnetic coupling between the solenoid RFID interrogator coil and the concentric RFID tag antenna when the solenoid RFID interrogator coil extends through the opening in the package and therefore through the concentric RFID tag antenna.

2. The system of claim 1 further comprising, a computer capable of communicating over the network.

3. The system of claim 1 further comprising, an inventory database indexable by item identification, including the inventory of the item on the hanger support, and capable of communicating over the network.

4. The system of claim 1 wherein the solenoid RFID interrogator coil is wound around the hanger support.

5. The system of claim 4 wherein a computer queries the one or more interrogator units at time intervals.

6. The system of claim 1 wherein a computer queries the one or more interrogator units as to its inventory.

7. The system of claim 1 wherein a computer receives a message from the one or more interrogator units as to a hanger support identity and the inventory stored upon it.

8. The system of claim 7 wherein the computer receives a message from the one or more interrogator units when the inventory stored upon the one or more interrogator units changes.

9. The system of claim 7 wherein the computer receives a message from the one or more interrogator units when the inventory of the item stored upon the one or more interrogator units differs from a predetermined inventory.

10. The system of claim 1 wherein the network comprises the Internet.

11. The system of claim 1 wherein the hanger support cross-section is circular.

12. The system of claim 1 wherein the RFID tag antenna comprises a conductive metal selected from the group consisting of copper, tin, aluminum, tantalum, silver, gold and platinum.

13. The system of claim 1 wherein the RFID tag antenna comprises a conductive ink.

14. The system of claim 13 wherein the RFID tag antenna is printed upon the item package.

15. The system of claim 13 wherein the RFID tag antenna is printed upon a separate medium that is affixed to the item package.

16. The system of claim 1 wherein the opening in the item package aligns the item package and a horizontal plane of the RFID tag antenna substantially perpendicular to the hanger support and its associated RFID interrogator coil.

17. The system of claim 16 wherein the opening in the item package touches the hanger support at two points.

18. The system of claim 17 wherein the opening in the item package is diamond-shaped.

19. A method of reading an item package with RFID capabilities, comprising:

receiving an item package to be hung from an item hanger, wherein the item hanger includes an integral RFID interrogator antenna comprising a solenoid RFID interrogator coil aligned with a longitudinal axis of the item hanger upon which RFID-tagged items are capable of being stored;

positioning an opening in the item package to facilitate hanging the package from the item hanger;

affixing a concentric RFID tag antenna around the opening in the item package to facilitate optimal electromagnetic coupling between the RFID tag antenna and the RFID interrogator antenna during operation;

hanging the item package by inserting the item hanger through the opening in the item package; and reading the RFID tag antenna by the RFID interrogator coil as the item package hangs from the item hanger.

20. The method of claim 19 wherein the item package is for a printer's ink cartridge.

21. The method of claim 19 wherein the item package comprises a cardboard box with a flap extending from the box to receive the opening to facilitate hanging the package from the item hanger.

22. The method of claim 19 wherein the item package comprises a flat sheet of material to which a plastic enclosure is attached to contain an item.

23. The method of claim 19 wherein the item package is comprised of a flat sheet of package material prior to being formed into a container.

* * * * *